US010409182B2

(12) United States Patent
Oyama et al.

(10) Patent No.: US 10,409,182 B2
(45) Date of Patent: Sep. 10, 2019

(54) METHOD FOR PRODUCING TONER FOR DEVELOPING ELECTROSTATIC IMAGES

(71) Applicant: ZEON CORPORATION, Tokyo (JP)

(72) Inventors: Fuminari Oyama, Tokyo (JP); Nobuhiko Okamoto, Tokyo (JP); Hironori Toshimitu, Tokyo (JP); Satoshi Izumi, Tokyo (JP); Bunta Yasuda, Tokyo (JP); Koichi Emura, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 15/434,430

(22) Filed: Feb. 16, 2017

(65) Prior Publication Data

US 2017/0248857 A1 Aug. 31, 2017

(30) Foreign Application Priority Data

Feb. 26, 2016 (JP) ................................ 2016-036439

(51) Int. Cl.
*G03G 9/08* (2006.01)
*G03G 9/09* (2006.01)
(Continued)

(52) U.S. Cl.
CPC ......... *G03G 9/0815* (2013.01); *B07B 1/4618* (2013.01); *B07B 1/4663* (2013.01);
(Continued)

(58) Field of Classification Search
CPC ... B07B 1/4618; B07B 1/4663; B07B 1/4681; B07B 1/00; B07B 1/4609
(Continued)

(56) References Cited

U.S. PATENT DOCUMENTS 2,037,271 A * 4/1936 Scheeler ................ D03D 25/00 139/425 R
3,477,571 A * 11/1969 Maag ....................... D21D 5/04 209/250
(Continued)

FOREIGN PATENT DOCUMENTS

JP 2001-34012 A 2/2001
JP 2003-43744 A 2/2003
(Continued)

*Primary Examiner* — Terrell H Matthews
(74) *Attorney, Agent, or Firm* — Westerman, Hattori, Daniels & Adrian, LLP

(57) ABSTRACT

A method for efficiently producing a toner for developing electrostatic images, which contains very few coarse particles and having excellent printing characteristics. The method can comprise a sieving step of removing coarse particles from colored resin particles by, using an air flow, supplying the colored resin particles to a sieve, wherein a metal mesh laminate comprising at least two metal meshes attached to each other by sintering, the metal meshes being different in opening size, is used as the sieve; wherein the metal meshes of the metal mesh laminate are laminated in order of opening size and, of the metal meshes constituting the metal mesh laminate, one having a smallest opening size is disposed on a side of supplying the colored resin particles; and wherein the opening size of the metal mesh having the smallest opening size is in a range of from 32 to 110 μm.

4 Claims, 2 Drawing Sheets

1

(51) Int. Cl.
*B07B 1/46* (2006.01)
*B07B 7/06* (2006.01)

(52) U.S. Cl.
CPC .............. *B07B 1/4681* (2013.01); *B07B 7/06* (2013.01); *G03G 9/0926* (2013.01)

(58) Field of Classification Search
USPC .......................... 209/233, 250, 397, 400, 401
See application file for complete search history.

(56) References Cited

U.S. PATENT DOCUMENTS

| | | | | | |
|---|---|---|---|---|---|
| 3,747,770 | A * | 7/1973 | Zentis | B01D 33/50 210/402 |
| 4,351,719 | A * | 9/1982 | Morey | B07B 1/46 209/234 |
| 5,735,403 | A * | 4/1998 | Stiglianese | B07B 7/06 209/23 |
| 6,129,216 | A * | 10/2000 | Vandewinckel | B07B 1/46 209/243 |
| 2003/0010437 | A1 * | 1/2003 | Adams | B01D 29/012 156/291 |
| 2006/0021921 | A1 * | 2/2006 | Frommann | B01D 33/067 210/158 |
| 2006/0046178 | A1 * | 3/2006 | Akiyama | G03G 9/0804 430/108.23 |
| 2009/0123755 | A1 | 5/2009 | Hayashi et al. | |
| 2009/0301943 | A1 * | 12/2009 | Bigelow | B07B 1/4618 209/399 |
| 2011/0241188 | A1 * | 10/2011 | Mizuno | C08G 59/08 257/666 |
| 2013/0101934 | A1 * | 4/2013 | Chiba | G03G 9/0819 430/108.7 |
| 2013/0319913 | A1 * | 12/2013 | Ozeki | B07B 1/00 209/233 |
| 2017/0248857 | A1 * | 8/2017 | Oyama | G03G 9/0815 |

FOREIGN PATENT DOCUMENTS

| | | | |
|---|---|---|---|
| JP | 2007-79444 | A | 3/2007 |
| JP | 2007079444 | A * | 3/2007 |
| JP | 2007101819 | A * | 4/2007 |
| WO | 2007/117041 | A1 | 10/2007 |

* cited by examiner

METHOD FOR PRODUCING TONER FOR DEVELOPING ELECTROSTATIC IMAGES

TECHNICAL FIELD

The present invention relates to a method for producing a toner for developing electrostatic images, which is applicable to development in electrophotographic image forming devices such as copying machines, facsimiles and printers.

BACKGROUND ART

In recent years, needs for electrophotographic color image forming devices has been increased, such as multifunctional printers, facsimile machines and printers. Color printing is required to reproduce color tones that are as high-resolution as and as sharp as photographs; therefore, there is a demand for color toners that are able to meet the request.

To meet the request for high resolution and high image quality, it is needed to reduce the particle diameter of colored resin particles and to narrow the particle diameter distribution range. Therefore, in general, a toner for developing electrostatic images is produced by carrying out a classification operation for removal of particles that are coarser than and particles that are finer than a predetermined particle distribution range (i.e., coarse particles and fine particles) and adding additives (e.g., external additives) as needed. Especially, since coarse particles contained in a toner cause defects in printed image quality (e.g., filming and white spots), there is a demand for a toner production method that is capable of efficient removal of coarse particles.

As a method for solving the above problems, a method for producing a toner for developing electrostatic images is disclosed in Patent Literature 1, in which coarse particles are removed from the toner for developing electrostatic images by use of a wind power sieving machine under a specific air flow rate condition, thereby carrying out a sieving treatment with almost no clogging of the sieve. In Patent Literature 1, it is mentioned that almost no clogging occurs in the sieving machine, and stable operation with an excellent product recovery rate is ensured by setting the flow rate of a first air (supplied to the sieving machine together with a mixture of toner base particles and external additives) and the flow rate of a second air (supplied from an air inlet disposed on a coarse particle collection side) in optimal ranges.

However, even by the production method of Patent Literature 1, the efficiency of coarse particle removal from the toner cannot be sufficient, and there is a demand for a method for producing a toner for developing electrostatic images, which has higher coarse particle removal efficiency.

Patent Literature 1: Japanese Patent Application Laid-Open No. 2007-79444

SUMMARY

An object of the present invention is to solve the above problems and provide a method for efficiently producing a toner for developing electrostatic images, the toner containing very few coarse particles and having excellent printing characteristics.

As a result of considerable research, the inventors of the present invention found that the above problems can be solved by use of a specific metal mesh laminate as a sieve when coarse particles are removed from colored resin particles by supplying the colored resin particles to the sieve using an air flow.

According to the present invention, a method for producing a toner for developing electrostatic images is provided, the method comprising a sieving step of removing coarse particles from colored resin particles by supplying the colored resin particles to a sieve using an air flow, wherein a metal mesh laminate comprising at least two metal meshes attached to each other by sintering is used as the sieve, the metal meshes being different in opening size; wherein the metal meshes of the metal mesh laminate are laminated in order of opening size and, of the metal meshes constituting the metal mesh laminate, one having a smallest opening size is disposed on a side of supplying the colored resin particles; and wherein the opening size of the metal mesh having the smallest opening size is in a range of from 32 to 110 μm.

In the production method of the present invention, the ratio of the opening sizes of two metal meshes randomly selected from all of the metal meshes constituting the metal mesh laminate, is preferably in a range of from 1.18 to 27 when the ratio of the opening sizes is determined as the ratio of the opening size of a metal mesh having a relatively large opening size with respect to the opening size of a metal mesh having a relatively small opening size.

In the production method of the present invention, the opening sizes of all of the metal meshes constituting the metal mesh laminate is preferably in a range of from 32 to 850 μm.

In the production method of the present invention, for all of the metal meshes constituting the metal mesh laminate, the longitude lines are preferably at right angles to the latitude lines; the longitude lines are preferably disposed approximately parallel to each other; and the latitude lines are preferably disposed approximately parallel to each other.

In the production method of the present invention, at the time of supplying the colored resin particles to the sieve using the air flow, the solid-air ratio of the colored resin particles with respect to the air is preferably set to be in a range of from 0.05 to 0.37 by mass.

In the production method of the present invention, the volume average particle diameter (Dv) of the colored resin particles supplied to the sieve using the air flow is preferably in a range of from 4 to 11 μm, and the content of coarse particles having a volume average particle diameter (Dv) of 20 μm or more in the colored resin particles, is preferably 0.2% or more by volume.

According to the present invention, the metal mesh laminate having the specific structure of at least two metal meshes attached to each other by sintering, the metal meshes being different in opening size, is used as the sieve, and of the metal meshes constituting the metal mesh laminate, the opening size of the metal mesh having the smallest opening size is set to be in a range of from 32 to 110 μm; therefore, sieve clogging control and increased durability can be realized at once. Therefore, the method for efficiently producing the toner for developing electrostatic images can be provided, the toner containing very few coarse particles and having excellent printing characteristics.

BRIEF DESCRIPTION OF THE DRAWINGS

In FIG. 3, S is a line of latitude lines of a metal mesh having a relatively small opening size, T is a line of latitude lines of a metal mesh having a relatively large opening size, U is a line of longitude lines of a metal mesh having a relatively small opening size, and V is a line of longitude lines of a metal mesh having a relatively large opening size.

DETAILED DESCRIPTION

The toner production method of the present invention is a method for producing a toner for developing electrostatic images, the method comprising a sieving step of removing coarse particles from colored resin particles by supplying the colored resin particles to a sieve using an air flow, wherein a metal mesh laminate comprising at least two metal meshes attached to each other by sintering is used as the sieve, the metal meshes being different in opening size; wherein the metal meshes of the metal mesh laminate are laminated in order of opening size and, of the metal meshes constituting the metal mesh laminate, one having a smallest opening size is disposed on a side of supplying the colored resin particles; and wherein the opening size of the metal mesh having the smallest opening size is in a range of from 32 to 110 μm.

Hereinafter, the method for producing the toner for developing electrostatic images (hereinafter may be simply referred to as "toner") according to the present invention will be described in detail.

1. The Sieving Step of Removing the Coarse Particles from the Colored Resin Particles The toner production method of the present invention comprises the sieving step of removing the coarse particles from the colored resin particles by supplying the colored resin particles to the sieve using the air flow.

Devices that are used in the production method of the present invention are not particularly limited, as long as they are able to supply the colored resin particles to the sieve using the air flow. In general, a device for sieving a fluid by allowing the fluid to pass through a fixed sieve, the fluid being in such a state that a powder to be treated is dispersed in an air flow (hereinafter it may be referred to as "fluidized powder"), is used.

As the device, examples include, but are not limited to, Hi-Bolter (product name; manufactured by: Toyo Hitec Co., Ltd.) and Spin Air Sieve (product name; manufactured by: Seishin Enterprise Co., Ltd.)

Figure 1:
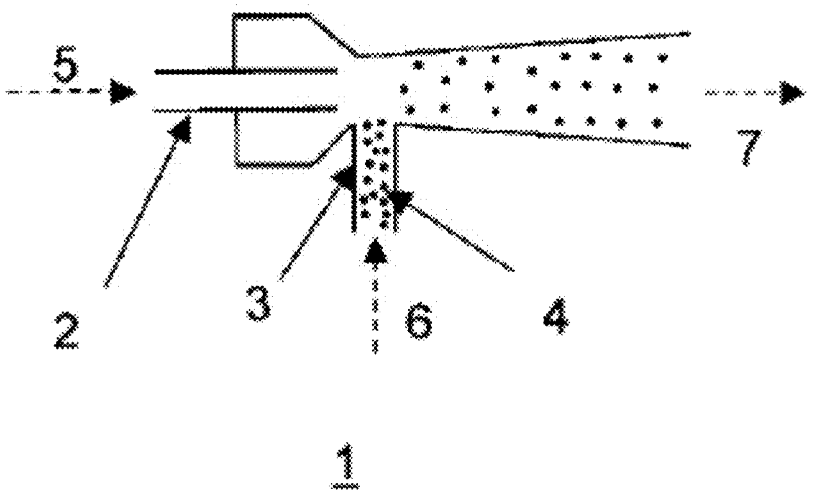
FIG. 1 is a schematic view of an example of an ejector that can be suitably used in the present invention.

In the production method of the present invention, the colored resin particles are preferably dispersed and supplied to the sieve through an ejector 1 as shown in FIG. 1. The ejector 1 is a disperser in which compressed air is injected from an air injection nozzle 2 to form a partial vacuum, thereby drawing a fluidized powder 4 from a fluidized powder inhalation nozzle 3 and dispersing and supplying the fluidized powder. By the use of the ejector, the colored resin particles can be uniformly supplied to the sieve, and the lifetime of the sieve can be extended.

For the production method of the present invention, conditions for supplying the colored resin particles to the sieve using the air flow are not particularly limited. The solid-air ratio of the colored resin particles with respect to the air is preferably in a range of from 0.05 to 0.37 by mass, more preferably in a range of from 0.07 to 0.34, still more preferably in a range of from 0.10 to 0.30. When the solid-air ratio is less than 0.05, the amount of the colored resin particles supplied to the sieve is small and may result in a decrease in productivity. When the solid-air ratio is more than 0.37, the concentration of the colored resin particles is too high to uniformly disperse the colored resin particles in the air flow, and sieve clogging or a decrease in yield may occur.

In the present invention, the solid-air ratio (by mass) of the colored resin particles with respect to the air is obtained by the following formula (1):

Solid-air ratio(kg/kg)=Colored resin particle supply rate(kg/Hr)/Air supply rate(kg/Hr)  Formula (1)

In the formula (1), the air supply rate is obtained by the following formula (2):

Air supply rate(kg/Hr)=Blower air volume($m^3$/Hr)× Air density(kg/$m^3$)  Formula (2)

In the formula (2) of the present invention, the air supply rate is calculated by considering the air density as 1.293 kg/$m^3$, which is the air density at 1 atm and 0° C.

In the production method of the present invention, the linear velocity of the air flow that passes through the sieve is not particularly limited. It is preferably in a range of from 60 to 125 m/min. By setting the linear velocity of the air flow in this range, the lifetime of the sieve can be extended.

Also in the present invention, the removal of the coarse particles is carried out by setting pressure difference before and after the sieving to generally 3 kPa or less and preferably to 2 kPa or less. The coarse particles can be efficiently removed with no sieve clogging, by setting the pressure difference before and after the sieving in the range.

In the production method of the present invention, a metal mesh laminate comprising at least two metal meshes attached to each other by sintering, the metal meshes being different in opening size, is used as the sieve. By the use of the metal mesh laminate obtained by attaching the metal meshes being different in opening size by sintering, the metal mesh laminate can be prevented from damage, and the coarse particles can be efficiently removed from the colored resin particles.

In the present invention, the metal meshes constituting the metal mesh laminate are not particularly limited, as long as they are metal meshes in which the longitude lines are disposed at equal intervals and the latitude lines are also disposed at equal intervals. The intervals between the longitude lines and those between the latitude lines may be the same or different. From the viewpoint of availability, it is preferable that the intervals between the longitude lines and those between the latitude lines are the same.

Figure 2:
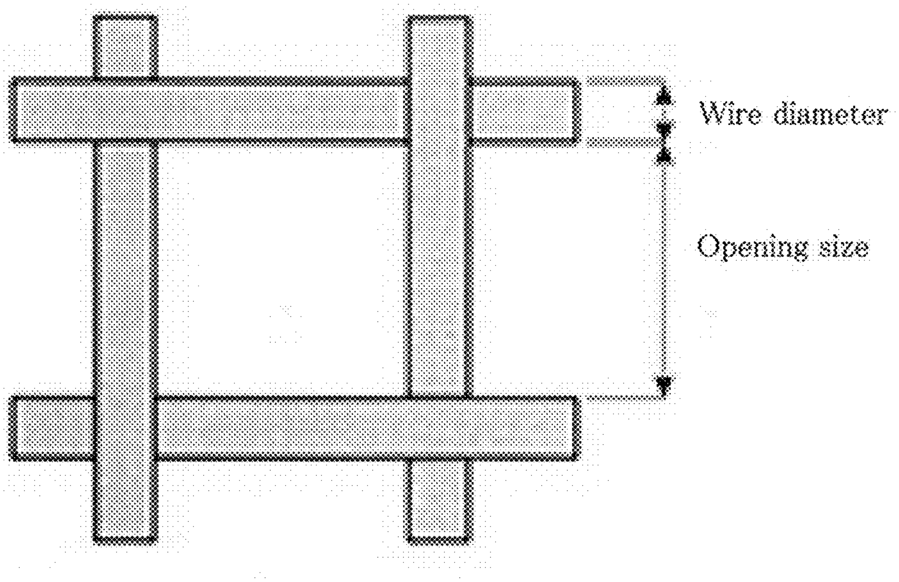
FIG. 2 is a view showing the opening size and wire diameter of a metal mesh used in the present invention.

As shown in FIG. 2, in the case of such a mesh that the longitude lines are disposed at equal intervals; the latitude lines are disposed at equal intervals; and the intervals between the longitude lines and those between the latitude lines are the same, the openings based on the latitude lines and those based on the longitude lines are the same; therefore, the openings are the same (except for measurement errors) even when they are measured at any point of the mesh.

Meanwhile, in the case of such a mesh that the longitude lines are disposed at equal intervals; the latitude lines are disposed at equal intervals; and the intervals between the longitude lines and those between the latitude lines are different, the openings based on the longitude lines and those based on the latitude lines are different.

In the present invention, in the case of using the metal mesh in which the intervals between the longitude lines and those between the latitude lines are different, the term "opening" or "openings" is determined to refer to, of the "opening" or "openings" based on the longitude lines and the "opening" or "openings" based on the latitude lines, smaller "opening" or "openings".

For the metal meshes used in the present invention, the longitude lines are preferably at right angles to the latitude lines.

The weave pattern of the metal meshes is not particularly limited. As the pattern, examples include, but are not limited to, a plain weave pattern and a twill weave pattern.

In the metal mesh laminate used in the present invention, the metal meshes are laminated in order of opening size and, of the metal meshes constituting the metal mesh laminate, one having the smallest opening size is disposed on the side of supplying the colored resin particles.

Figure 3:
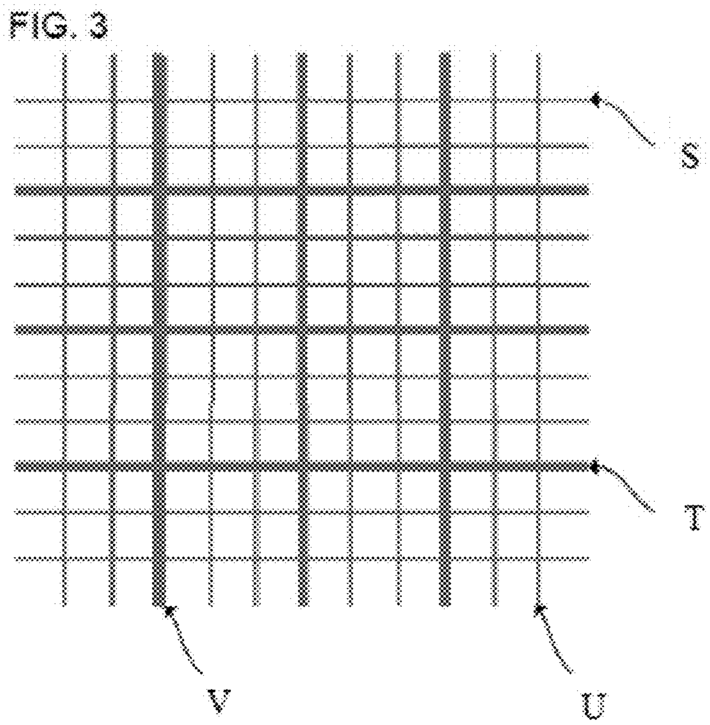
FIG. 3 is a schematic view of a metal mesh laminate in which the longitude lines of two metal meshes being different in opening size are disposed approximately parallel to each other, and the latitude lines of the same are disposed approximately parallel to each other.

As shown in FIG. 3, from the viewpoint of preventing a decrease in opening ratio as much as possible, it is preferable to use a metal mesh laminate in which the longitude lines of all of metal meshes constituting the metal mesh laminate are disposed approximately parallel to each other, and the latitude lines of the metal meshes are disposed approximately parallel to each other.

For the metal mesh laminate used in the present invention, the opening size of the metal mesh having, of the metal meshes constituting the metal mesh laminate, the smallest opening size is in a range of from 32 to 110 μm, preferably in a range of from 38 to 100 μm, and more preferably in a range of from 45 to 90 μm.

When the opening size of the metal mesh having the smallest opening size is less than 32 μm, after sintering, the opening ratio of the metal mesh is too small, and the pressure difference before and after the sieving is too large. Therefore, the metal mesh is highly likely to be damaged, even though it is a sintered metal mesh. Also, the probability of occurrence of clogging due to the small opening size markedly increases; therefore, there is no contribution to the object of the present invention, that is, an increase in productivity and a decrease in production cost.

On the other hand, when the opening size of the metal mesh having the smallest opening size is more than 110 μm, the coarse particles that should be removed are allowed to pass through the metal mesh. Therefore, a toner with excellent printing characteristics cannot be produced.

For the metal mesh laminate used in the present invention, the number of the laminated metal meshes is not particularly limited, as long as the metal mesh laminate is composed of at least two metal meshes being different in opening size. The number of the laminated metal meshes is preferably 4 or less, and more preferably 3 or less.

For the metal mesh laminate used in the present invention, the ratio of the opening sizes of two metal meshes randomly selected from all of the metal meshes constituting the metal mesh laminate, is preferably in a range of from 1.18 to 27, more preferably in a range of from 1.50 to 15, and still more preferably in a range of from 2.0 to 10, when the ratio of the opening sizes is determined as the ratio of the opening size of a metal mesh having a relatively large opening size with respect to the opening size of a metal mesh having a relatively small opening size.

When the ratio of the opening size of the metal mesh having the relatively large opening size with respect to the opening size of the metal mesh having the relatively small opening size, is less than 1.18, the metal mesh having the relatively large opening size makes a small reinforcement effect, and the opening ratio of the metal mesh having the relatively small opening size markedly decreases. Therefore, the metal mesh laminate may be clogged or damaged.

On the other hand, when the ratio is more than 27, the difference in opening size between the metal meshes is too large, and the metal mesh having the relatively small opening size passes through the opening of the metal mesh having the relatively large opening size. Therefore, the reinforcement effect is small.

For the metal mesh laminate used in the present invention, the opening sizes of all of the laminated metal meshes are preferably in a range of from 32 to 850 μm.

When metal meshes having an opening size of less than 32 μm are used as the metal meshes constituting the metal mesh laminate, the metal meshes are highly likely to be damaged even after they are sintered, and the probability of occurrence of clogging markedly increases. When metal meshes having an opening size of more than 850 μm are used, there is no sieve reinforcement effect.

The material for wires used as the latitude lines and longitude lines of the metal meshes constituting the metal mesh laminate, is not particularly limited. As the material, examples include, but are not limited to, stainless steel. The wires are preferably antistatic wires.

The diameter of the wire (wire diameter) is not particularly limited. The wire diameter of the metal mesh having the relatively small opening size is preferably in a range of from 20 to 90 μm, and more preferably in a range of from 25 to 80 μm.

The ratio of the wire diameters of two metal meshes randomly selected from all of the metal meshes constituting the metal mesh laminate, is preferably in a range of from 1.1 to 26 and more preferably in a range of from 1.15 to 20, when the ratio of the wire diameters is determined as the ratio of the wire diameter of the metal mesh having the relatively large opening size with respect to the wire diameter of the metal mesh having the relatively small opening size.

For the metal mesh laminate used in the present invention, the wire diameters of all the laminated metal meshes are preferably in a range of from 20 to 550 μm, and more preferably in a range of from 25 to 525 μm.

2. The Colored Resin Particles Applicable to the Sieving Step

As the colored resin particles applicable to the production method of the present invention, particles containing a binder resin and a colorant as essential components and containing a charge control agent, a release agent, etc., as needed, are generally used.

A conventionally-known method for producing colored resin particles will be described below. The method allows coarse particles to be contained in colored resin particles thus obtained, and the coarse particles serve as a cause for white spots or filming. Therefore, to obtain a toner with high printing performance, the removal of the coarse particles is needed. Especially, such colored resin particles that the volume average particle diameter (Dv) is in a range of from 4 to 11 μm and the content of coarse particles having a volume average particle diameter (Dv) of 20 μm or more is 0.2% or more by volume, can make a remarkable printing performance increasing effect, by removing the coarse particles by the production method of the present invention. The content of the coarse particles having a Dv of 20 μm or more in the colored resin particles, can be measured by a particle size analyzer (product name: Multisizer; manufactured by: Beckman Coulter, Inc.), for example.

The colored resin particle production method that is applicable to the production method of the present invention, is not particularly limited. As the colored resin particle production method, examples include, but are not limited to, a conventionally-known wet method and a conventionally-known dry method. Hereinafter, (A) a suspension polymerization method and (B) a pulverization method will be described, as a typical example of the wet method and that of the dry method, respectively. Also, the general processes of the methods will be described.

(A) The Suspension Polymerization Method (A-1) The Step of Preparing a Polymerizable Monomer Composition First, a polymerizable monomer composition is prepared by mixing, dissolving or dispersing a polymerizable monomer, a colorant and, as needed, additives such as a charge control agent and a release agent. The preparation of the polymerizable monomer composition is carried out by use of a media type disperser, for example.

A polymerizable monomer is a monomer having a polymerizable functional group and is polymerized into a binder resin. As a main component of the polymerizable monomer, a monovinyl monomer is preferably used.

As the monovinyl monomer, examples include, but are not limited to, styrene; styrene derivatives such as vinyltoluene and α-methylstyrene; acrylic acid and methacrylic acid; acrylic esters such as methyl acrylate, ethyl acrylate, propyl acrylate, butyl acrylate, 2-ethylhexyl acrylate and dimethylaminoethyl acrylate; methacrylic esters such as methyl methacrylate, ethyl methacrylate, propyl methacrylate, butyl methacrylate, 2-ethylhexyl methacrylate and dimethylaminoethyl methacrylate; acrylamide and methacrylamide; and olefins such as ethylene, propylene and butylene. These monovinyl monomers can be used alone or in combination of two or more kinds.

Of these monovinyl monomers, styrene, styrene derivatives, acrylic esters and methacrylic esters are particularly preferred.

To improve the storage shelf stability (blocking resistance) of the toner, any of crosslinkable polymerizable monomers can be used as a part of the polymerizable monomer, in combination with the above-mentioned monovinyl monomer. The crosslinkable polymerizable monomer is a monomer having two or more polymerizable functional groups.

The crosslinkable polymerizable monomer is not particularly limited, as long as it is one that is generally used as a crosslinkable polymerizable monomer for a toner. As the crosslinkable polymerizable monomer, examples include, but are not limited to, aromatic divinyl compounds such as divinyl benzene, divinyl naphthalene and derivatives thereof; difunctional ethylenically unsaturated carboxylic esters such as ethylene glycol dimethacrylate and diethylene glycol dimethacrylate; heteroatom-containing divinyl compounds such as N,N-divinylaniline and divinyl ether; and compounds having three or more vinyl groups such as trimethylolpropane trimethacrylate and dimethylolpropane tetraacrylate. These crosslinkable polymerizable monomers can be used alone or in combination of two or more kinds.

In the present invention, with respect to 100 parts by mass of the monovinyl monomer, the amount of the crosslinkable polymerizable monomer is generally in a range of from 0.1 to 5 parts by mass, and preferably in a range of from 0.3 to 2 parts by mass.

To improve the balance between the storage shelf stability and low-temperature fixability of the toner, any of macromonomers can be used as a part of the polymerizable monomer, in combination with the above-mentioned monovinyl monomer.

The macromonomer is a reactive oligomer or polymer having a polymerizable carbon-carbon unsaturated bond at the end of a polymer chain and generally having a number average molecular weight (Mn) of 1,000 to 30,000. As the macromonomer, preferred is an oligomer or polymer having a higher glass transition temperature (Tg) than a polymer (binder resin) obtained by polymerization of the polymerizable monomer.

In the present invention, with respect to 100 parts by mass of the monovinyl monomer, the amount of the macromonomer is generally in a range of from 0.01 to 10 parts by mass, preferably in a range of from 0.03 to 5 parts by mass, and more preferably in a range of from 0.1 to 2 parts by mass.

To produce color toners (generally, the following four kinds of color toners are used: a black toner, a cyan toner, a yellow toner and a magenta toner), a black colorant, a cyan colorant, a yellow colorant and a magenta colorant can be used as the colorants of the color toners.

As the black colorant, examples include, but are not limited to, carbon black, titanium black and pigments such as magnetic powders of zinc-iron oxide and nickel-iron oxide.

As the cyan colorant, examples include, but are not limited to, compounds such as copper phthalocyanine pigments, derivatives thereof, and anthraquinone pigments. As the compounds, examples include, but are not limited to, C. I. Pigment Blue 2, 3, 6, 15, 15:1, 15:2, 15:3, 15:4, 16, 17:1 and 60.

As the yellow colorant, examples include, but are not limited to, compounds such as azo pigments (e.g., monoazo pigments and disazo pigments) and condensed polycyclic pigments. As the compounds, examples include, but are not limited to, C. I. Pigment Yellow 3, 12, 13, 14, 15, 17, 62, 65, 73, 74, 83, 93, 97, 120, 138, 155, 180, 181, 185 and 186.

As the magenta colorant, examples include, but are not limited to, compounds such as azo pigments (e.g., monoazo pigments and disazo pigments) and condensed polycyclic pigments. As the compounds, examples include, but are not limited to, C. I. Pigment Violet 19 and C. I. Pigment Red 31, 48, 57:1, 58, 60, 63, 64, 68, 81, 83, 87, 88, 89, 90, 112, 114, 122, 123, 144, 146, 149, 150, 163, 170, 184, 185, 187, 202, 206, 207, 209 and 251.

These colorants can be used alone or in combination of two or more kinds.

In the present invention, with respect to 100 parts by mass of the polymerizable monomer, the amount of the colorant is generally in a range of from 1 to 10 parts by mass.

To improve the charge property of the toner, a positively- or negatively-chargeable charge control agent can be used as another additive.

The charge control agent is not particularly limited, as long as it is one that is generally used as a charge control agent for a toner. Of charge control agents, a positively- or negatively-chargeable charge control resin is preferred, since it has high compatibility with binder resins (or polymerizable monomers) and is able to impart stable charge property (charge stability) to toner particles.

In the present invention, with respect to 100 parts by mass of the polymerizable monomer, the amount of the charge control agent is generally in a range of from 0.3 to 10 parts by mass, and preferably in a range of from 0.5 to 8 parts by mass.

To control the molecular weight or molecular weight distribution of the binder resin, a molecular weight modifier can be used as another additive.

The molecular weight modifier is not particularly limited, as long as it is one that is generally used as a molecular weight modifier for a toner. As the molecular weight modifier, examples include, but are not limited to, mercaptans such as t-dodecyl mercaptan, n-dodecyl mercaptan, n-octyl mercaptan and 2,2,4,6,6-pentamethylheptane-4-thiol, and thiuram disulfides such as tetramethyl thiuram disulfide, tetraethyl thiuram disulfide, tetrabutyl thiuram disulfide, N,N'-dimethyl-N,N'-diphenyl thiuram disulfide and N,N'-dioctadecyl-N,N'-diisopropyl thiuram disulfide. These molecular weight modifiers may be used alone or in combination of two or more kinds.

In the present invention, with respect to 100 parts by mass of the polymerizable monomer, the amount of the molecular weight modifier is generally in a range of from 0.01 to 10 parts by mass, and more preferably in a range of from 0.1 to 5 parts by mass.

(A-2) The Suspension Step of Obtaining a Suspension (Droplet Forming Step)

A suspension (polymerizable monomer composition dispersion) is obtained by suspending, in an aqueous dispersion medium, the polymerizable monomer composition obtained in the polymerizable monomer composition preparing step (A-1). Here, “suspending” means forming droplets of the polymerizable monomer composition in the aqueous dispersion medium. To form the droplets of the polymerizable monomer composition, a dispersion treatment is carried out by use of a device that is capable of strong agitation, such as an in-line type emulsifying and dispersing machine (product name: MILDER; manufactured by: Pacific Machinery & Engineering Co., Ltd.) or a high-speed emulsifying and dispersing machine (product name: T. K. Homomixer Mark II; manufactured by: PRIMIX Corporation).

As the aqueous dispersion medium, water can be used alone or in combination with a water-soluble solvent such as lower alcohol or lower ketone.

For better particle diameter control and circularity of colored resin particles, a dispersion stabilizer is preferably added to the aqueous dispersion medium during the droplet formation.

As the dispersion stabilizer, examples include, but are not limited to, sulfates such as barium sulfate and calcium sulfate; carbonates such as barium carbonate, calcium carbonate and magnesium carbonate; phosphates such as calcium phosphate; metal compounds including metal oxides such as aluminum oxide and titanium oxide and metal hydroxides such as aluminum hydroxide, magnesium hydroxide and iron(II) hydroxide; water-soluble polymer compounds such as polyvinyl alcohol, methyl cellulose and gelatin; and organic polymer compounds such as anionic surfactants, nonionic surfactants and ampholytic surfactants. Of them, metal hydroxides are preferred. Particularly preferred is magnesium hydroxide that is generally used in a pH range of from 7.5 to 11.

Of the above dispersion stabilizers, preferred is one containing a colloid of a hardly water-soluble metal hydroxide (hardly water-soluble inorganic compound) that is soluble in acid solution. The above dispersion stabilizers can be used alone or in combination of two or more kinds.

With respect to 100 parts by mass of the polymerizable monomer, the amount of the dispersion stabilizer is preferably in a range of from 0.1 to 20 parts by mass, and more preferably in a range of from 0.2 to 10 parts by mass.

A polymerization initiator is used to polymerize the polymerizable monomer composition. As the polymerization initiator, examples include, but are not limited to, inorganic persulfates such as potassium persulfate and ammonium persulfate; azo compounds such as 4,4'-azobis (4-cyanovaleric acid), 2,2'-azobis(2-methyl-N-(2-hydroxyethyl)propionamide), 2,2'-azobis(2-amidinopropane) dihydrochloride, 2,2'-azobis(2,4-dimethylvaleronitrile) and 2,2'-azobisisobutyronitrile; and organic peroxides such as di-t-butyl peroxide, benzoyl peroxide, t-butyl peroxy-2-ethylhexanoate, t-hexyl peroxy-2-ethylhexanoate, t-butyl peroxypivalate, di-isopropyl peroxydicarbonate, di-t-butyl peroxyisophthalate and t-butyl peroxyisobutyrate. Of them, organic peroxides are preferred.

The polymerization initiator may be added at the stage after the polymerizable monomer composition is dispersed in the aqueous dispersion medium containing the dispersion stabilizer and before the droplets are formed. Also, the polymerization initiator may be directly added to the polymerizable monomer composition.

With respect to 100 parts by mass of the polymerizable monomer, the amount of the polymerization initiator is preferably in a range of from 0.1 to 20 parts by mass, more preferably in a range of from 0.3 to 15 parts by mass, and still more preferably in a range of from 1.0 to 10 parts by mass.

(A-3) The Polymerization Step

The suspension (the aqueous dispersion medium containing the droplets of the polymerizable monomer composition) obtained by the suspension obtaining step (A-2) (the droplet forming step) was heated to initiate polymerization, thereby obtaining an aqueous dispersion of colored resin particles.

In the present invention, the polymerization temperature is preferably 50° C. or more, and more preferably 60 to 98° C.

Also in the present invention, the polymerization time is preferably 1 to 20 hours, and more preferably 2 to 15 hours.

To carry out the polymerization during the droplets of the polymerizable monomer composition are in a stably dispersed state, the polymerization reaction may be developed while the dispersion treatment by agitation is carried out also in this polymerization step, following the suspension obtaining step (A-2) (the droplets forming step).

Core-shell type (or “capsule type”) colored resin particles may be used, which are obtained by using the colored resin particles obtained by the polymerization step as a core layer and forming a shell layer around the core layer.

The core-shell type colored resin particles can take the balance between lowering of toner fixing temperature and prevention of blocking at storage, since the core layer comprising a substance having a low softening point is covered with the shell layer comprising a substance having a higher softening point.

A method for producing the core-shell type colored resin particles is not particularly limited, and the core-shell type colored resin particles can be produced by any of conventional methods. The in-situ polymerization method and the phase separation method are preferred from the viewpoint of production efficiency.

A method for producing the core-shell type colored resin particles by the in-situ polymerization method will be hereinafter described.

The core-shell type colored resin particles can be obtained by carrying out polymerization by adding a polymerizable monomer for forming a shell layer (a polymerizable monomer for shell) and a polymerization initiator for shell to an aqueous dispersion medium in which the colored resin particles are dispersed.

As the polymerizable monomer for shell, examples include, but are not limited to, the above-described polymerizable monomers. Of them, those that are able to give polymers having a glass transition temperature (Tg) of more than 80° C., are preferably used alone or in combination of two or more kinds, such as styrene and methyl methacrylate.

The polymerization initiator for shell is used to polymerize the polymerizable monomer for shell. As the polymerization initiator for shell, examples include, but are not limited to, metal persulfates such as potassium persulfate and ammonium persulfate, and water-soluble azo compounds such as 2,2'-azobis(2-methyl-N-(2-hydroxyethyl) propionamide) and 2,2'-azobis-(2-methyl-N-(1,1-bis(hydroxymethyl)2-hydroxyethyl)propionamide).

With respect to 100 parts by mass of the polymerizable monomer for shell, the amount of the polymerization initiator for shell is preferably in a range of from 0.1 to 30 parts by mass, and more preferably in a range of from 1 to 20 parts by mass.

The shell layer polymerization temperature is preferably 50° C. or more, and more preferably in a range of from 60 to 95° C. The shell layer polymerization time is preferably in a range of from 1 to 20 hours, and more preferably in a range of from 2 to 15 hours.

(A-4) The Washing, Filtering, Dehydrating and Drying Steps

It is preferable that after the polymerization, the aqueous dispersion of the colored resin particles obtained by the polymerization, is subjected to operations including filtering, washing (for removal of the dispersion stabilizer), dehydrating, and drying several times as needed, according to any of conventional methods.

As the washing method, if an inorganic compound is used as the dispersion stabilizer, it is preferable that the dispersion stabilizer is dissolved in water and removed by adding an acid or an alkali to the aqueous dispersion of the colored resin particles. If a colloid of a hardly water-soluble inorganic hydroxide is used as the dispersion stabilizer, it is preferable to control the pH of the aqueous dispersion of the colored resin particles to 6.5 or less by adding an acid. As the acid, examples include, but are not limited to, inorganic acids such as sulfuric acid, hydrochloric acid and nitric acid, and organic acids such as formic acid and acetic acid. Sulfuric acid is particularly preferred for its high removal efficiency and small impact on production facilities.

As the dehydrating and filtering methods, various conventional methods can be used, and there is no particular limitation thereon. Examples include, but are not limited to, a centrifugal filtration method, a vacuum filtration method and a pressure filtration method. The drying method is not particularly limited and can be carried out by any of various methods.

(B) The Pulverization Method

In the case of producing the colored resin particles by the pulverization method, the following processes are carried out.

First, a binder resin, a colorant and other additives added as needed, such as a charge control agent and a release agent, are mixed by use of a mixing machine such as a ball mill, a V-type mixer, FM Mixer (product name; manufactured by: Nippon Coke & Engineering Co., Ltd.), a high-speed dissolver or an internal mixer. Next, the thus-obtained mixture is kneaded while heating, by use of a press kneader, a twin screw extruding kneader or a roller. The thus-obtained kneaded product is coarsely pulverized by use of a pulverizer such as a hammer mill, a cutter mill or a roller mill and then finely pulverized by use of a pulverizer such as a jet mill or a high-speed rotary pulverizer, thereby obtaining colored resin particles produced by the pulverization method.

As the binder resin, the colorant and the other additives added as needed, such as the charge control agent and the release agent, examples include, but are not limited to, those exemplified above under "(A) Suspension polymerization method". The colored resin particles obtained by the pulverization method can be core-shell type colored resin particles by a method such as the in-situ polymerization method, similarly as the colored resin particles obtained above by "(A) Suspension polymerization method".

As the binder resin, other resins that have been broadly used for toners can be used. As the binder resin used in the pulverization method, examples include, but are not limited to, polystyrene, styrene-butyl acrylate copolymers, polyester resins and epoxy resins.

3. The Colored Resin Particles from which the Coarse Particles have been Removed by the Sieving Step For the colored resin particles from which the coarse particles have been removed by the sieving step of the production method of the present invention, compared to the colored resin particles before being subjected to the sieving step, the content of the coarse particles having a volume average particle diameter (Dv) of 20 μm or more is lower, and the particle diameter distribution range is narrower.

The volume average particle diameter (Dv) of the colored resin particles from which the coarse particles have been removed by the production method of the present invention, is preferably in a range of from 4 to 11 μm, and more preferably in a range of from 5 to 10 μm. If Dv is less than 4 μm, the flowability of the toner decreases and may result in a deterioration in transferability or a decrease in image density. If Dv is more than 11 μm, image resolution may decrease.

For the colored resin particles from which the coarse particles have been removed by the production method of the present invention, the ratio (Dv/Dn) of the volume average particle diameter (Dv) and the number average particle diameter (Dn) is preferably in a range of from 1.0 to 1.3, and more preferably in a range of from 1.0 to 1.2. If the ratio (Dv/Dn) is more than 1.3, a decrease in transferability, image density and resolution may occur. The volume average particle diameter and the number average particle diameter of the colored resin particles can be measured by, for example, a particle size analyzer (product name: Multisizer; manufactured by: Beckman Coulter, Inc.)

For the colored resin particles from which the coarse particles have been removed by the production method of the present invention, the average circularity is preferably in a range of from 0.96 to 1.00, more preferably in a range of from 0.97 to 1.00, and still more preferably in a range of from 0.98 to 1.00, from the viewpoint of image reproducibility.

If the average circularity of the colored resin particles is less than 0.96, a deterioration in thin-line reproducibility may occur in printing.

In the present invention, circularity is determined as a value obtained by dividing the perimeter of a circle having the same area as the area of a projected particle image by the perimeter of the projected particle image. Also in the present invention, average circularity is used as a simple method to quantitatively represent the shape of particles and is an indicator of the convexo-concave level of the colored resin particles. The average circularity is "1" when the colored resin particles are absolutely spherical, and it becomes smaller as the surface shape of the colored resin particles becomes more complex.

4. The Step of Producing a Toner from the Colored Resin Particles from which the Coarse Particles have been Removed According to the present invention, there is no particular limitation on the method for producing a toner from the colored resin particles from which the coarse particles have been removed. The colored resin particles themselves from which the coarse particles have been removed, may be used as a toner. It is preferable to produce a one-component toner (developer) from the colored resin particles from which the coarse particles have been removed, by mixing and agitating the colored resin particles with an external additive to cover the surface of the particles with the external additive. The one-component toner may be further mixed and agitated with carrier particles to produce a two-component developer.

An agitator is used to cover the colored resin particles with the external additive. The agitator is not particularly limited, as long as it is an agitating machine that is able to cover the surface of the colored resin particles with the external additive. For example, the colored resin particles can be covered with the external additive by use of an agitator that is able to mix and agitate the colored resin particles with the external additive, such as FM Mixer (product name; manufactured by: Nippon Coke & Engineering Co., Ltd.), Super Mixer (product name; manufactured by: Kawata Mfg. Co., Ltd.), Q Mixer (product name; manufactured by: Nippon Coke & Engineering Co., Ltd.), Mechanofusion System (product name; manufactured by: Hosokawa Micron Corporation) and Mechanomill (product name; manufactured by: Okada Seiko Co., Ltd.)

As the external additive, examples include, but are not limited to, inorganic fine particles comprising silica, titanium oxide, aluminum oxide, zinc oxide, tin oxide, calcium carbonate, calcium phosphate and/or cerium oxide, and organic fine particles comprising a polymethyl methacrylate resin, a silicone resin and/or a melamine resin. Of them, the inorganic particles are preferred. Of the inorganic particles, particles comprising silica and/or titanium oxide are preferred, and particles comprising silica are particularly preferred.

These external additives can be used alone or in combination of two or more kinds. It is particularly preferable to use two or more kinds of silica particles in combination, the two or more kinds of particles being different in particle diameter.

5. The Toner Obtained by the Production Method of the Present Invention

The toner obtained through the above steps is less likely to cause white spots and filming and has excellent printing performance, since the coarse particles have been removed therefrom.

EXAMPLES

Hereinafter, the present invention will be described further in detail, with reference to examples and comparative examples. However, the scope of the present invention may not be limited to the following examples. Here, "part(s)" and "%" are based on mass if not particularly mentioned.

Test methods used in the examples and the comparative examples are as follows. A sieving step was ended when a sieve was damaged or clogged. When the sieve was not damaged or clogged, the sieving step was ended after a continuous operation of 1000 hours. All metal meshes used in the examples and comparative examples are such metal meshes that the longitude lines are at right angles to the latitude lines; the longitude lines are disposed at equal intervals; the latitude lines are disposed at equal intervals; and the intervals between the longitude lines and those between the latitude lines are the same (i.e., the openings of the metal meshes are square openings).

Example 1

1. Preparation of a Sieving Machine

A metal mesh laminate was prepared by attaching a first metal mesh (wire diameter: 45 μm, opening size A: 63 μm) and a second metal mesh (wire diameter: 340 μm, opening size B: 500 μm) to each other by sintering. The sintering was carried out while the first and second metal meshes were in such a state that the longitude lines of the first metal mesh were parallel to those of the second metal mesh, and the latitude lines of the first metal mesh were parallel to those of the second metal mesh.

The metal mesh laminate was installed in a blow-through type sieving machine (product name: Hi-Bolter; model: NR-450S; manufactured by: Toyo Hitec Co., Ltd.) so that the colored resin particles were supplied from the first metal mesh side.

2. Preparation of Colored Resin Particles Before being Subjected to Sieving

First, the following raw materials were mixed to prepare a mixture: 81 parts of styrene and 19 parts of n-butyl acrylate as monovinyl monomers (the glass transition temperature (Tg) of a copolymer to be obtained: 55° C.); 0.3 part of a polymethacrylic acid ester macromonomer (product name: AA6; manufactured by: Toagosei Chemical Industry Co., Ltd.; the Tg of a polymer to be obtained: 94° C.) as a macromonomer; 0.5 part of divinylbenzene as a crosslinkable polymerizable monomer; 1.2 parts of t-dodecyl mercaptan as a molecular weight modifier; and 7 parts of carbon black (product name: #25B; manufactured by: Mitsubishi Chemical Corporation) as a black colorant. The mixture was wet-ground by use of a media type disperser.

The following raw materials were added to, mixed with and dissolved in the mixture obtained by the wet-grinding, thereby obtaining a polymerizable monomer composition: 1 part of a charge control resin (product name: Acrybase FCA-207P; a styrene acrylic resin manufactured by: Fujikura Kasei Co., Ltd.) as a charge control agent, and 7 parts of dipentaerythritol hexamyristate (product name: W-663; manufactured by: NOF Corporation) as a release agent.

Under room temperature, an aqueous solution of sodium hydroxide dissolved in ion-exchanged water was gradually added to an aqueous solution of magnesium chloride dissolved in ion-exchanged water, with agitating, thereby preparing a magnesium hydroxide colloid dispersion (a hardly water-soluble metal hydroxide colloid dispersion).

Meanwhile, 1 part of methyl methacrylate (the Tg of a polymer to be obtained: 105° C.) was finely dispersed in 65 parts of water by use of an ultrasonic emulsifying machine to obtain an aqueous dispersion of a polymerizable monomer for shell.

The polymerizable monomer composition was put in the magnesium hydroxide colloid dispersion and agitated under room temperature. As a polymerization initiator, 5 parts of t-butyl peroxy-2-ethylhexanoate (product name: PERBUTYL O; manufactured by: NOF Corporation) was added thereto. Then, by use of an in-line type emulsifying and dispersing machine (product name: Milder; manufactured by: Pacific Machinery & Engineering Co., Ltd.), the mixture was subjected to a high shear agitation at 15,000 rpm for dispersion, until a suspension thus obtained (a polymerizable monomer composition dispersion) was circulated 10 times, thereby forming droplets of the polymerizable monomer composition.

The suspension in which the droplets of the polymerizable monomer composition were dispersed (the polymerizable monomer composition dispersion) was put into a reactor equipped with agitation blades, and the temperature was raised to 90° C. to initiate a polymerization reaction. When the polymerization conversion rate reached almost 100%, 0.1 part of 2,2'-azobis(2-methyl-N-(2-hydroxyethyl)-propionamide) (product name: VA-086; a water soluble polymerization initiator for shell manufactured by: Wako Pure Chemical Industries) was dissolved in the aqueous dispersion of the polymerizable monomer for shell, and the resulting product was added in the reactor. The polymerization reaction was continued for 4 hours at 90° C. and then stopped by water cooling, thereby obtaining an aqueous dispersion of colored resin particles having a core-shell structure (pH 9.3).

Acid washing and pH control of the colored resin particle aqueous dispersion were carried out by, with agitating the aqueous dispersion, adding a 10% diluted sulfuric acid aqueous solution (an aqueous solution containing 10% by weight of sulfuric acid) in a dropwise manner to the aqueous dispersion until the pH of the aqueous dispersion reached 6.0. All liquid was removed from the pH-controlled colored resin particle aqueous dispersion by centrifugal separation, and deposits thus obtained were dried by a vacuum drier.

By the above method, the colored resin particles before being subjected to sieving were prepared. The volume average particle diameter (Dv) of the colored resin particles is 7.8 μm, and the content of the coarse particles having a Dv of 20 μm or more (hereinafter may be simply referred to as coarse particles) in the colored resin particles is 0.3% by volume.

3. Sieving Step

By use of the blow-through type sieving machine, under the following conditions, the colored resin particles before being subjected to sieving were supplied to the metal mesh laminate for sieving:

Blower air volume: 14 $m^3$/min

The amount of the supplied colored resin particles: 250 kg/Hr

Solid-air ratio: 0.23

Example 2

Sieving was carried out in the same manner as Example 1, except that the metal mesh laminate was changed to such a metal mesh laminate that the first metal mesh has a wire diameter of 52 μm and an opening size A of 75 μm, and the colored resin particles before being subjected to sieving were changed to such colored resin particles before being subjected to sieving, that the Dv is 9.5 μm and the content of the coarse particles is 0.7% by volume.

Example 3

Sieving was carried out in the same manner as Example 1, except that the metal mesh laminate was changed to such a metal mesh laminate that the first metal mesh has a wire diameter of 32 μm and an opening size A of 45 μm; the colored resin particles before being subjected to sieving were changed to such colored resin particles before being subjected to sieving, that the Dv is 9.5 μm and the content of the coarse particles is 0.7% by volume; the amount of the supplied colored resin was changed to 200 kg/Hr; and the solid-air ratio was changed to 0.18.

Example 41

Sieving was carried out in the same manner as Example 1, except that the colored resin particles before being subjected to sieving were changed to such colored resin particle before being subjected to sieving, that the Dv is 6.0 μm and the content of the coarse particles is 0.4% by volume; the amount of the supplied colored resin was changed to 100 kg/Hr; and the solid-air ratio was changed to 0.09.

Example 51

Sieving was carried out in the same manner as Example 1, except that the metal mesh laminate was changed to such a metal mesh laminate that the first metal mesh has a wire diameter of 52 μm and an opening size A of 75 μm and the second metal mesh has a wire diameter of 523 μm and an opening size B of 850 μm, and the colored resin particles before being subjected to sieving were changed to such colored resin particles before being subjected to sieving, that the Dv is 6.0 μm and the content of the coarse particles is 0.4% by volume.

Example 6

Sieving was carried out in the same manner as Example 1, except that the metal mesh laminate was changed to a metal mesh laminate obtained by attaching a first metal mesh (wire diameter: 32 μm, opening size A: 45 μm), a second metal mesh (wire diameter: 104 μm, opening size B: 150 μm) and a third metal mesh (wire diameter: 523 μm, opening size C: 850 μm) in this order by sintering, while the longitude lines of the metal meshes were in a state of being parallel to each other, and the latitude lines of the same were in a state of being parallel to each other; the colored resin particles before being subjected to sieving were changed to such colored resin particles before being subjected to sieving, that the Dv is 6.0 μm and the content of the coarse particles is 0.4% by volume; the amount of the supplied colored resin was changed to 200 kg/Hr; and the solid-air ratio was changed to 0.18.

Example 7

Sieving was carried out in the same manner as Example 1, except that the amount of the supplied colored resin was changed to 350 kg/Hr, and the solid-air ratio was changed to 0.32.

Comparative Example 1

Sieving was carried out in the same manner as Example 1, except that the metal mesh laminate was changed to such a metal mesh laminate that the first metal mesh has a wire diameter of 32 μm and an opening size A of 45 μm, and the first and second metal meshes were not attached to each other; and the colored resin particles before being subjected to sieving were changed to such colored resin particles before being subjected to sieving, that the Dv is 9.5 μm and the content of the coarse particles is 0.7% by volume.

Comparative Example 2

Sieving was carried out in the same manner as Example 1, except that the metal mesh laminate was changed to such a metal mesh laminate that the first metal mesh has a wire diameter of 23 μm and an opening size A of 25 μm and the second metal mesh has a wire diameter of 75 μm and an opening size B of 106 μm; the amount of the supplied colored resin was changed to 200 kg/Hr; and the solid-air ratio was changed to 0.18.

5. Results

For Examples 1 to 7 and Comparative Examples 1 and 2, the sieving conditions and the sieving efficiency evaluation results are shown in Table 1.

TABLE 1

| | Example 1 | Example 2 | Example 3 | Example 4 | Example 5 | Example 6 | Example 7 | Comparative Example 1 | Comparative Example 2 |
|---|---|---|---|---|---|---|---|---|---|
| Wire diameter of the first metal mesh (μm) | 45 | 52 | 32 | 45 | 52 | 32 | 45 | 32 | 23 |
| Opening size A of the first metal mesh (μm) | 63 | 75 | 45 | 63 | 75 | 45 | 63 | 45 | 25 |
| Wire diameter of the second metal mesh (μm) | 340 | 340 | 340 | 340 | 523 | 104 | 340 | 340 | 75 |
| Opening size B of the second metal mesh (μm) | 500 | 500 | 500 | 500 | 850 | 150 | 500 | 500 | 106 |
| Wire diameter of the third metal mesh (μm) | — | — | — | — | — | 523 | — | — | — |
| Opening size C of the third metal mesh (μm) | — | — | — | — | — | 850 | — | — | — |
| Number of metal meshes attached | 2 | 2 | 2 | 2 | 2 | 3 | 2 | 2 | 2 |
| Relationship of longitude lines/latitude lines | Parallel | Parallel | Parallel | Parallel | Parallel | Parallel | Parallel | Parallel | Parallel |
| Decrease in Opening ratio due to attaching of the metal meshes | Smallest | Smallest | Smallest | Smallest | Smallest | Smallest | Smallest | Smallest | Smallest |
| Method of attaching the metal meshes | Sintering | Sintering | Sintering | Sintering | Sintering | Sintering | Sintering | — | Sintering |
| Opening size ratio (opening size B/opening size A) | 7.94 | 6.67 | 11.11 | 7.94 | 11.33 | 3.33 | 7.94 | 11.11 | 4.24 |
| Opening size ratio (opening size C/opening size A) | — | — | — | — | — | 18.89 | — | — | — |
| Opening size ratio (opening size C/opening size B) | — | — | — | — | — | 5.67 | — | — | — |
| Blower air volume ($m^3$/min) | 14 | 14 | 14 | 14 | 14 | 14 | 14 | 14 | 14 |
| Amount of the supplied colored resin particles (kg/Hr) | 250 | 250 | 200 | 100 | 250 | 200 | 350 | 250 | 200 |
| Solid-air ratio (kg/kg) | 0.23 | 0.23 | 0.18 | 0.09 | 0.23 | 0.18 | 0.32 | 0.23 | 0.18 |
| Dv of the colored resin particles before being subjected to sieving (μm) | 7.8 | 9.5 | 9.5 | 6 | 6 | 6 | 7.8 | 9.5 | 7.8 |
| Amount of the coarse particles before being subjected to sieving (Dv: 20 μm or more) (% by volume) | 0.3 | 0.7 | 0.7 | 0.4 | 0.4 | 0.4 | 0.3 | 0.7 | 0.3 |
| Dv of the colored resin particles subjected to sieving (μm) | 7.8 | 9.5 | 9.5 | 6 | 6 | 6 | 7.8 | 9.5 | 7.8 |
| Amount of the coarse particles subjected to sieving (Dv: 20 μm or more) (% by volume) | 0.2 | 0.4 | 0.3 | 0.2 | 0.3 | 0.2 | 0.2 | 0.4 | 0.1 |
| Continuous operation time (Hr) | 1000 | 1000 | 1000 | 1000 | 1000 | 1000 | 1000 | 400 | 10 |
| Pressure difference at the start of operation (kPa) | 0.4 | 0.2 | 1.5 | 0.2 | 0.2 | 2 | 1.5 | 1.5 | 2 |

TABLE 1-continued

| | Example 1 | Example 2 | Example 3 | Example 4 | Example 5 | Example 6 | Example 7 | Comparative Example 1 | Comparative Example 2 |
|---|---|---|---|---|---|---|---|---|---|
| Pressure difference at the end of operation (kPa) | 0.4 | 0.2 | 1.5 | 0.2 | 0.2 | 2 | 3 | 2 | 5 |
| Sieve condition | No clogging | No clogging | No clogging | No clogging | No clogging | No clogging | No clogging | No clogging | Clogged |
| Presence of damage | No | No | No | No | No | No | No | Yes | No |

Hereinafter, the relationship between the sieving conditions and the efficiency of the sieving will be discussed with reference to Table 1.

Table 1 shows that in Comparative Example 1, the metal mesh laminate in which the first and second metal meshes are not attached to each other, was used as the sieve to remove the coarse particles from the colored resin particles.

In Comparative Example 1, the content of the coarse particles in the colored resin particles before being subjected to sieving, is 0.7% by volume; however, the content of the coarse particles in the colored resin particles subjected to sieving, is 0.4% by volume. Therefore, it is clear that the coarse particles could be removed from the colored resin particles.

However, from the fact that the continuous operation time is 400 hours and the metal mesh laminate was damaged, it is clear that the coarse particles could not be efficiently removed from the colored resin particles. This is considered to be because there was a lack of strength since the first and second metal meshes were not sintered.

Table 1 shows that in Comparative Example 2, the metal mesh laminate in which the opening size A of the first metal mesh is 25 μm and is the smallest, was used as the sieve to remove the coarse particles from the colored resin particles.

In Comparative Example 2, the content of the coarse particles in the colored resin particles before being subjected to sieving, is 0.3% by volume; however, the content of the coarse particles in the colored resin particles subjected to sieving, is 0.1% by volume. Therefore, it is clear that the coarse particles could be removed from the colored resin particles.

However, from the fact that the continuous operation time is 10 hours and the metal mesh laminate was clogged, it is clear that the coarse particles could not be efficiently removed from the colored resin particles. This is considered to be because clogging became more likely to occur since the opening size of the first metal mesh, which is the smallest opening size, is 25 μm and too small.

Table 1 shows that in Examples 1 to 7, the metal mesh laminate obtained by attaching the two or three metal meshes being different in opening size by sintering (the opening size A of the first metal mesh, which is the smallest opening size, is in a range of from 45 to 75 μm) was used as the sieve to remove the coarse particles from the colored resin particles.

In all of Examples 1 to 7, the content of the coarse particles in the colored resin particles subjected to sieving, is smaller than the content of the coarse particles in the colored resin particles before being subjected to sieving. Therefore, it is clear that the coarse particles could be removed from the colored resin particles.

Also in Examples 1 to 7, the metal mesh laminate was not clogged or damaged, and a continuous operation of 1000 hours or more was achieved. Therefore, it is clear that the coarse particles can be efficiently removed from the colored resin particles.

The reason is considered as follows: since the opening size A of the first metal mesh, which is the smallest opening size, is in a range of from 45 to 75 μm, the coarse particles can be removed without clogging; moreover, sufficient strength could be obtained by attaching and laminating the metal mesh having the smallest opening size and the metal mesh(s) having the larger opening size(s) by sintering.

REFERENCE SIGNS LIST

1. Ejector
2. Air injection nozzle
3. Fluidized powder inhalation nozzle
4. Fluidized powder
5. Air injection direction
6. Fluidized powder inhalation direction
7. Travelling direction of dispersed fluidized powder

The invention claimed is:

1. A method for producing a toner for developing electrostatic images, the method comprising a sieving step of removing coarse particles from colored resin particles by, using an air flow, supplying the colored resin particles to a sieve, wherein when the colored resin particles are supplied to the sieve using the air flow, a solid-air ratio of the colored resin particles with respect to the air is set to be in a range of from 0.05 to 0.37 by mass, wherein a metal mesh laminate comprising at least two metal meshes attached to each other by sintering, the metal meshes being different in opening size, is used as the sieve;

wherein the metal meshes of the metal mesh laminate are laminated in order of opening size and one of the metal meshes having a smallest opening size is disposed on a side of supplying the colored resin particles;

wherein the opening size of the metal mesh having the smallest opening size is in a range of from 32 to 110 μm; and wherein a ratio of opening sizes of two metal meshes randomly selected from all of the metal meshes constituting the metal mesh laminate, is in a range of from 1.18 to 27 when the ratio of the opening sizes is determined as a ratio of an opening size of a metal mesh having a relatively large opening size with respect to an opening size of a metal mesh having a relatively small opening size.

2. The method for producing the toner for developing electrostatic images according to claim 1, wherein the opening sizes of all of the metal meshes constituting the metal mesh laminate are in a range of from 32 to 850 μm.

3. The method for producing the toner for developing electrostatic images according to claim 1, wherein, for all of the metal meshes constituting the metal mesh laminate, longitude lines are at right angles to latitude lines; the longitude lines of all of the metal meshes are disposed approximately parallel to each other; and the latitude lines of all of the metal meshes are disposed approximately parallel to each other.

4. The method for producing the toner for developing electrostatic images according to claim 1, wherein a volume average particle diameter (Dv) of the colored resin particles supplied to the sieve using the air flow is in a range of from 4 to 11 μm, and a content of coarse particles having a volume average particle diameter (Dv) of 20 μm or more in the colored resin particles, is 0.2% or more by volume.

* * * * *